(12) United States Patent
Heise

(10) Patent No.: US 10,361,551 B2
(45) Date of Patent: Jul. 23, 2019

(54) END SEAL FOR HEATING CABLE

(71) Applicant: Heat-Line Corporation, Algonquin Highlands (CA)

(72) Inventor: Lorne R. Heise, Algonquin Highlands (CA)

(73) Assignee: Heat-Line Corporation, Algonquin Highlands (CA)

( * ) Notice: Subject to any disclaimer, the term of this patent is extended or adjusted under 35 U.S.C. 154(b) by 34 days.

(21) Appl. No.: 15/655,217

(22) Filed: Jul. 20, 2017

(65) Prior Publication Data
US 2018/0026433 A1 Jan. 25, 2018

Related U.S. Application Data

(60) Provisional application No. 62/365,012, filed on Jul. 21, 2016.

(51) Int. Cl.
*H01R 4/00* (2006.01)
*H02G 15/013* (2006.01)
*H01B 7/02* (2006.01)
*H01B 13/00* (2006.01)
*H05B 3/56* (2006.01)
*H05B 3/04* (2006.01)

(52) U.S. Cl.
CPC ......... *H02G 15/013* (2013.01); *H01B 7/0216* (2013.01); *H01B 13/0036* (2013.01); *H05B 3/04* (2013.01); *H05B 3/56* (2013.01)

(58) Field of Classification Search
USPC ...... 174/110 R, 110 A–110 E, 113 R, 120 R, 174/120 SR
See application file for complete search history.

(56) References Cited

U.S. PATENT DOCUMENTS

| 1,089,714 | A | | 6/1931 | Raymond | |
|---|---|---|---|---|---|
| 2,716,740 | A | * | 8/1955 | Parish | H02G 3/0616 174/77 R |
| 2,933,708 | A | | 4/1960 | Elliot | |
| 2,949,642 | A | * | 8/1960 | Lieberman | H01R 43/24 174/76 |
| 3,378,673 | A | | 4/1968 | Hopper | |

(Continued)

FOREIGN PATENT DOCUMENTS

WO  WO 96/34511  * 10/1996  ............... H05B 3/56

OTHER PUBLICATIONS

Heat-Line Brochure—Winter Water Anywhere, Anytime; Jan. 28, 2005.

(Continued)

*Primary Examiner* — William H. Mayo, III
(74) *Attorney, Agent, or Firm* — Blake, Cassels & Graydon LLP; John R. S. Orange; Brett J. Slaney

(57) ABSTRACT

A method of forming an end seal on a cable. The method includes placing a curable sealant in a cavity formed in a boot, inserting an end of the cable in to the cavity with the boot extending about the exterior of the cable, forcing the cable in to the curable sealant while inhibiting the egress of curable sealant from the boot to force the curable sealant along the interior of the cable, curing the curable sealant to provide a stable load supporting layer of sealant within the cable, and applying a crimping ring to the boot in the area of the load supporting layer to secure the boot to the cable.

20 Claims, 3 Drawing Sheets

(56) References Cited

U.S. PATENT DOCUMENTS

| | | | |
|---|---|---|---|
| 3,764,779 A | 10/1973 | Kadoya | |
| 3,816,641 A * | 6/1974 | Iversen | H01R 13/523 |
| | | | 174/75 C |
| 4,069,410 A | 1/1978 | Keep | |
| 4,185,187 A | 1/1980 | Rogers | |
| 4,266,844 A * | 5/1981 | Chelminski | H01R 13/523 |
| | | | 439/453 |
| 4,388,523 A | 6/1983 | Keep | |
| 4,423,311 A | 12/1983 | Varney | |
| 4,500,151 A * | 2/1985 | Ayers | H01R 13/523 |
| | | | 174/76 |
| 4,501,952 A | 2/1985 | Lehrke | |
| 4,553,023 A | 11/1985 | Jameson | |
| 4,616,894 A | 10/1986 | Baker | |
| 4,653,160 A * | 3/1987 | Thorkildsen | H01R 43/052 |
| | | | 140/105 |
| 4,855,569 A | 8/1989 | Widermann | |
| 4,868,967 A * | 9/1989 | Holt | F16L 5/02 |
| | | | 174/135 |
| 5,127,151 A * | 7/1992 | Weigert | H01R 43/052 |
| | | | 29/742 |
| 5,129,034 A | 7/1992 | Sydenstricker | |
| 5,183,966 A * | 2/1993 | Hurtado | G01V 1/201 |
| | | | 174/19 |
| 5,381,511 A | 1/1995 | Bahar | |
| 5,791,377 A | 8/1998 | LaRochelle | |
| 5,859,953 A | 1/1999 | Nickless | |
| 5,872,890 A | 2/1999 | LaCombe | |
| 5,892,887 A | 4/1999 | Thomas | |
| 5,933,574 A | 8/1999 | Avansino | |
| 6,147,308 A | 11/2000 | Santagata | |
| 6,205,292 B1 | 3/2001 | Pokorny | |
| 6,428,344 B1 * | 8/2002 | Reed | H01R 9/05 |
| | | | 439/455 |
| 6,456,785 B1 | 9/2002 | Evans | |
| 6,573,484 B1 | 6/2003 | Yue | |
| 6,738,566 B2 | 5/2004 | Pagnella | |
| 6,943,319 B2 | 9/2005 | Jones | |
| 7,424,211 B2 | 9/2008 | Lehmann | |
| 7,565,065 B2 | 7/2009 | Kato | |
| 7,622,677 B2 | 11/2009 | Barberree | |
| 8,007,302 B2 * | 8/2011 | Kleinke | H01R 9/03 |
| | | | 439/275 |
| 8,028,721 B2 | 10/2011 | Koskey | |
| 8,238,733 B2 | 8/2012 | Sawada | |
| 8,291,939 B2 | 10/2012 | Ferrone | |
| 8,657,618 B2 * | 2/2014 | Beuster | H01R 13/53 |
| | | | 439/283 |
| 8,747,138 B2 * | 6/2014 | Brune | H01R 13/5202 |
| | | | 439/278 |
| 8,946,554 B1 * | 2/2015 | Petner | H02G 15/046 |
| | | | 174/74 R |
| 9,206,934 B2 | 12/2015 | Reusche | |
| 9,434,328 B2 * | 9/2016 | Oka | H01R 4/20 |
| 9,568,137 B2 | 2/2017 | Heise | |
| 9,624,806 B2 | 4/2017 | Mann | |
| 9,664,086 B2 | 5/2017 | Birman | |
| 2004/0131346 A1 | 7/2004 | Chamberlain | |
| 2008/0317450 A1 | 12/2008 | Sawada | |
| 2009/0266435 A1 | 10/2009 | Ferrone | |
| 2014/0174822 A1 * | 6/2014 | Corona | H01R 4/02 |
| | | | 174/77 R |
| 2015/0240693 A1 | 8/2015 | Birman | |
| 2015/0270029 A1 * | 9/2015 | Wakabayashi | H01B 7/282 |
| | | | 174/72 A |
| 2015/0270696 A1 * | 9/2015 | Wakabayashi | H02G 3/0468 |
| | | | 174/72 A |
| 2015/0279516 A1 * | 10/2015 | Wakabayashi | H01B 7/282 |
| | | | 174/77 R |

OTHER PUBLICATIONS

Heat-Line Brochure—Freeze Protection Systems—RetroLine & Heatline; Oct. 2006.

* cited by examiner

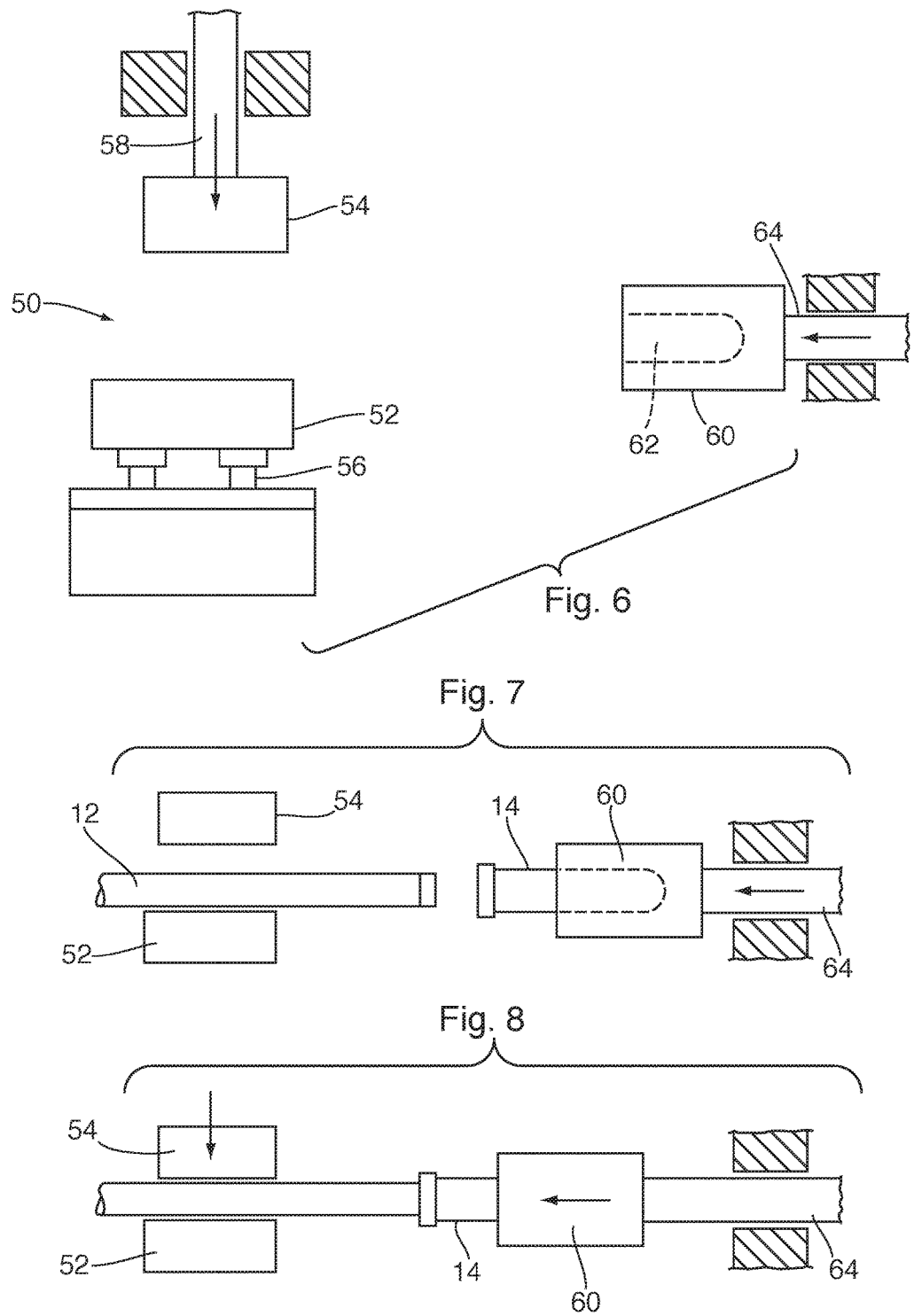

END SEAL FOR HEATING CABLE

CROSS-REFERENCE TO RELATED APPLICATION

This application claims priority to U.S. Patent Application No. 62/365,012, filed on Jul. 21, 2016, and titled "End Seal for Heating Cable", the entire contents of which are herein incorporated by reference.

FIELD OF THE INVENTION

The present invention relates to methods of sealing an end of a heating cable and apparatus therefore.

DESCRIPTION OF THE PRIOR ART

Heating cables are used to deliver a heating effect at a desired location and thereby prevent low temperatures at those locations. The heating cable has a pair of electrical conductors that extend along its length with a resistive coupling between the conductors. Electrical current passing through the conductors produces a heating effect which can be transmitted to surrounding environments. One such heating cable is available from Pentair under the trade name BTV Self-Regulating Heating Cable.

One common use of a heating cable is within a conduit that carries a liquid, such as an oil or water. The cable is inserted within the conduit so as to be encompassed in the liquid. Electrical current is applied to the cable to produce heat and maintain the liquid at the required temperature. A typical application is the freeze proofing of a residential water supply line, as exemplified by the product available under the trade name Retro-line from Heat-Line Freeze Protection Systems of Algonquin Highlands, Ontario.

The immersion of the cable within the liquid requires the end of the cable to be sealed against ingress of liquid. To effect sealing, a boot may be fitted over the end of the cable. Silicon is added to the boot prior to assembly to assist the sealing and the boot is secured to the cable by a crimped ring. In some circumstances however it is found that the body of the cable is unable to withstand the crimping forces and a distortion of the cable or boot may occur. In some cases this can result in damage to the conductors of the cable and in other it can result in leakage of the liquid in to the boot.

It is therefore an object of the present invention to obviate or mitigate the above disadvantages.

SUMMARY OF THE INVENTION

In general terms, the present invention provides a method of forming an end seal on a cable comprising the steps of providing a curable sealant in a cavity formed in a boot; inserting an end of the cable in to the cavity with the boot extending about the exterior of the cable; forcing the cable in to the curable sealant whilst inhibiting the egress of curable sealant from the boot to force the curable sealant along the interior of the cable; curing the curable sealant to provide a stable load supporting layer of sealant within the cable; and applying a crimping ring to the boot in the area of the load supporting layer to secure the boot to the cable.

Preferably, the curable sealant is an epoxy adhesive.

As a further preference, the cable has a conductive core with a protective jacket and a braided protective layer between the core protective jacket and the exterior outer coating of the cable.

A further aspect of the invention provides an assembly jig having a pair of jaws to grip a cable and a moveable support for a boot, said support being moveable toward said jaws to force said boot on to said cable.

Preferably, said support encompasses said boot and inhibits radial expansion of said boot.

BRIEF DESCRIPTION OF THE DRAWINGS

An embodiment of the invention will now be described with reference to the accompanying drawings wherein:

FIG. 6 is a plan view of a jig to facilitate assembly of the components of FIG. 4;

FIG. 7 is a plan view, similar to FIG. 7 with the components located in the jig; and FIG. 8 is a view similar to FIG. 7 after assembly of the components.

DETAILED DESCRIPTION OF THE INVENTION

Figure 1:
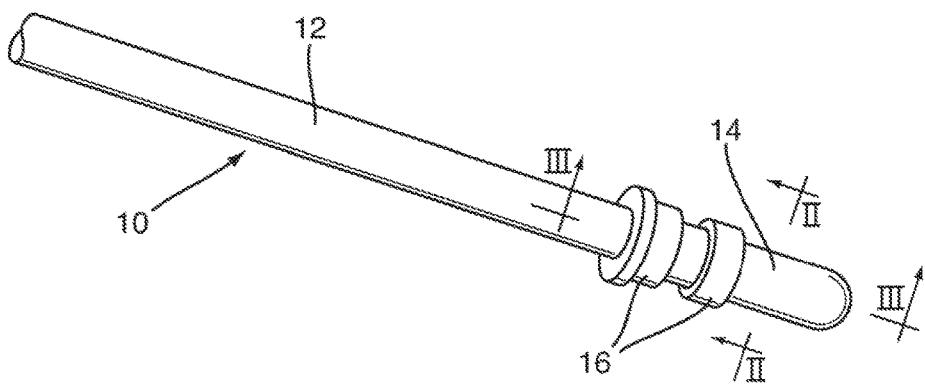
FIG. 1 is a perspective representation of a heating cable.
Figure 2:
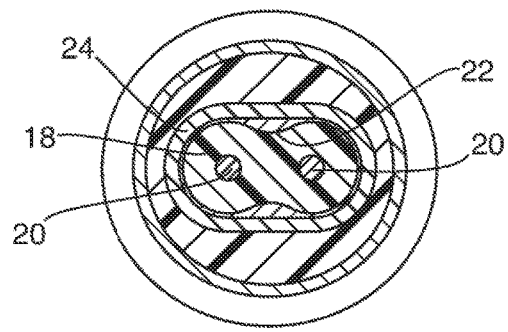
FIG. 2 is a section on the line II-II of FIG. 1.
Figure 3:
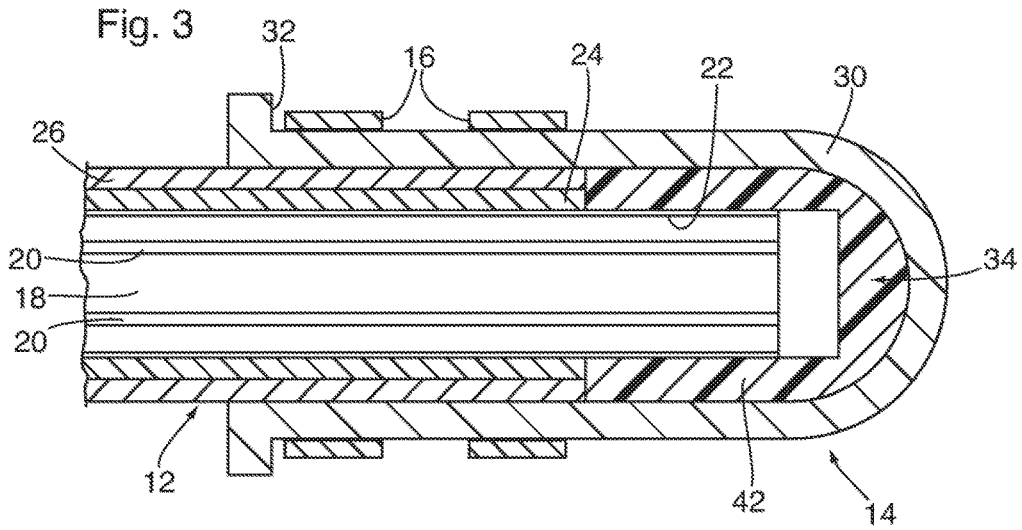
FIG. 3 is a section on the line III-III of FIG. 1.

Referring therefore to FIGS. 1 to 3, a heating cable 10 includes a cable 12 and a sealing boot 14. The boot 14 is secured to the cable 12 by mechanical fasteners, such as crimping rings 16. The cable 12 has a conductive core 18 with a pair of conductors 20 that extend along the length of the cable 12 embedded in the core 18. A polyolefin protective jacket 22 is extruded around the core 18 to separate the core 18 from a braided metallic sheath 24 that may also be used to ground the cable electrically. The metallic sheath 24 is encased in a fluoropolymer casing 26 which provides a barrier from liquids and or substances from which the cable is submersed. The cable 12 has a generally oval cross section, as determined by the shape of the core 18, and is of indeterminate length. It will be appreciated that the cable 12 described above is typical of such cables and the exact arrangement of the cable may vary from manufacturer to manufacturer.

The sealing boot 14 has a body 30 formed from a thermoplastic vulcanizate (TPV) available under the trade name Santoprene and is generally circular in cross section. A shoulder 32 is formed at one end and a cavity 34 is molded in the body 30 to extend from the end adjacent the shoulder 32. The cavity 34 is complementary in shape to the cross section of the cable 12 and in its free body state is slightly smaller than the cable 12. The cable 12 is thus a tight sliding fit in the cavity 34 with the pliancy of the boot 14 allowing sufficient stretch for the cable 12 to be inserted in the cavity 34. It has been found that an interference fit in the order of the thickness of the exterior plastics casing 26 is satisfactory.

The rings 16 are a clearance fit on the boot 14 and are made from stainless steel or similar malleable material. The rings 16 are designed to be crimped on to the boot 14 to provide a compressive force capable of withstanding great external pressures between the boot 14 and cable 12.

Figure 4:
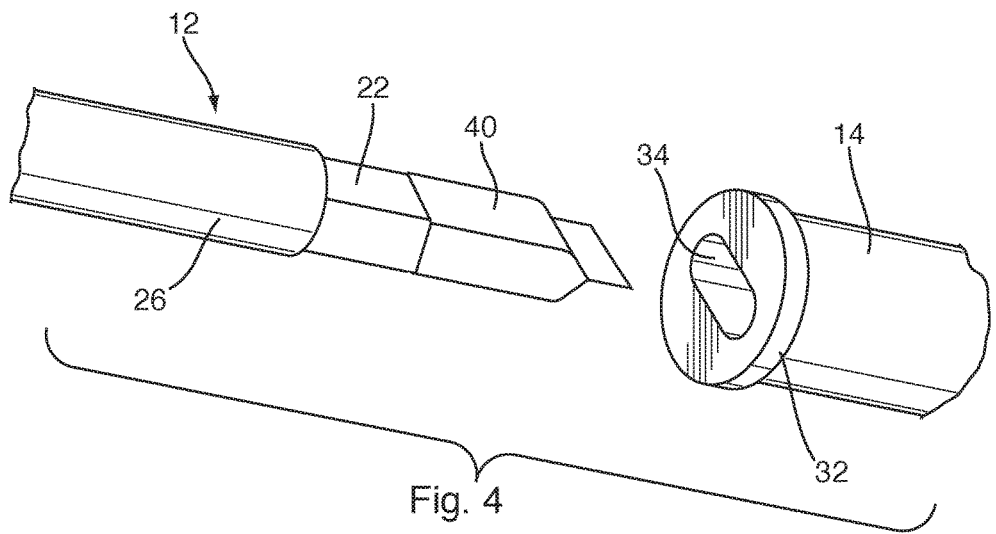
FIG. 4 is a perspective view showing components of the heating cable of FIG. 1 prior to assembly.
Figure 5:
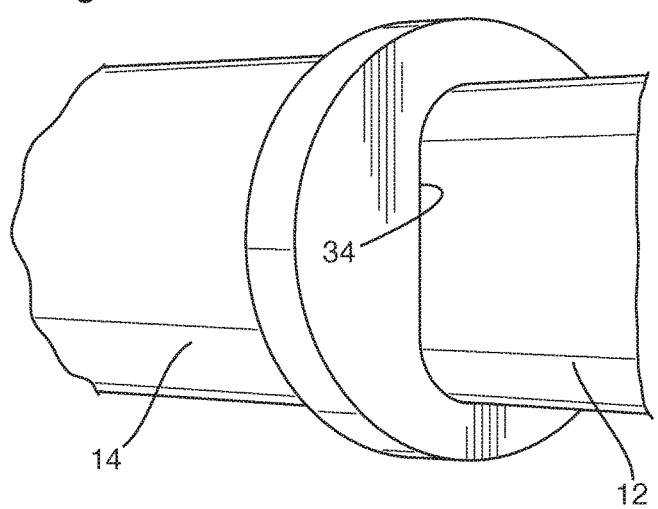
FIG. 5 is a perspective view of the components of FIG. 4 after assembly.

To secure the boot 14 to the cable, the exterior casing 26 and metallic sheath 24 is first removed from one end of the cable 14, as shown in FIG. 4. Approximately ¾ inch of the polyolefin film 22 and core 18 is exposed. A heat shrink hood 40 is then placed over the film 22 and heat shrunk on to the film to provide a tight fit that prevents entry of moisture and more importantly epoxy adhesive into the core during the assembly process.

A curable sealant 42 is then placed within the cavity 34 so as to partially fill the cavity 34. It has been found that between 50% and 75% of the volume of the cavity 34 is sufficient. Sufficient sealant is required to ensure its deployment along the interior of the cable beyond the boot 14, as explained below, and it is preferred not to completely fill the cavity to avoid sealant 42 from flowing out of the boot 14 during initial assembly. The sealant is preferably a two part epoxy adhesive that is admixed as it is injected in to the cavity 34. A commercial product sold under the trade name Loctite EA E-90 FL Hysol adhesive has been used successfully.

With the curable sealant in the cavity 34, the cable 14 is inserted. The initial insertion is facilitated by the removal of the exterior casing 26 and sheath 24, which allows the end to be inserted in to the mouth of the cavity 34. When the exterior casing 26 abuts the end face of the boot 14, the interference fit seals the cavity 34 and traps the sealant 42. Further movement of the cable 14 in to the cavity 34 forces the sealant 42 in to the mesh of the braided sheath 24, which provides a porous layer within the cable 14. The sealant 42 flows along the cable 12 between the exterior casing 26 and the polyolefin film 22 as it is expelled from the cavity 34 by continued insertion of the cable 12. The sealant flows within the braided sheath in the voids provided by the braiding and thus effectively fills the free space within the metallic sheath 24. The extent of its travel will depend on the volume provided initially in the cavity 34 but should extend along the cable 12 beyond the extent of the boot 14.

When the cable 12 is fully inserted, the sealant 42 is allowed to cure until a stable load supporting layer of material is provided within the cable 12. Once cured, the rings 16 are slid on the boot 14 and crimped to hold the boot 14 in place. The cured sealant 42 provides sufficient support for the boot 14 to be compressed without crushing the core 18 or deforming the cable 12 within the cavity 34.

With the preferred combination of boot 14 and sealant 42, the sealant does not adhere to the boot 14 so that if it is necessary to remove the boot 14 for repair of inspection it can be done. The mesh of the metallic sheath 24 provided by the braiding acts as a filamentary support for the sealant 42 to provide a strong structure that can withstand the compressive load of the rings 16.

The insertion of the cable 12 in to the cavity 34 requires significant force and therefore a jig is used, as indicated at 50 in FIG. 6. The jig 50 consists of a pair of jaws 52, 54, one of which 52 is fixed and the other of which 54 is moveable. The position of the fixed jaw 52 can be adjusted by adjusting screws 56 so the spacing of the jaws can be adjusted. The moveable jaw 54 is mounted on a sliding rod 58 that can be moved by any suitable mechanism such as an air cylinder or an over centre toggle lever.

The jig 50 also includes a support 60 for the boot 14 which is spaced axially from the jaws 53, 54. The support 60 is cylindrical with an axial recess 62 that conforms to the shape of the boot 14. The support 60 is mounted on a slidable rod 64 which is driven by a cylinder or toggle lever, or other suitable mechanism.

To place the boot 34 on the cable 14, the boot 14 is placed in the recess 62 after the sealant has been inserted in to the cavity 34. The cable 12 is then positioned between the jaws 52, 54 with the free end of the cable aligned with the mouth of the cavity 34. The moveable jaw 54 is moved toward the fixed jaw 52 to grip the cable and resist axial forces applied to the cable 12.

The support 60 is then moved axially toward the jaws 52, 54 to push the boot 14 on to the cable 12. The support 60 inhibits the boot 14 from expanding radially and thus helps to maintain a seal between the boot 14 and cable 12 as the sealant 42 is expelled from the cavity 34. One the support reaches the limit of its travel, it is reversed to leave the boot 14 on the cable and the jaws 52, 54 opened to release the cable 12.

Once cured, the ring 16 is crimped in place to provide the completed heating cable 10.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

What is claimed is:

1. A method of forming an end seal on a cable having a conductive core and an exterior casing, said method comprising the steps of providing a curable sealant in a cavity formed in a boot; inserting an end of the cable in to the cavity with the boot extending about the exterior of the cable; forcing the cable in to the curable sealant whilst inhibiting the egress of curable sealant from the boot to force the curable sealant along the interior of the cable between said conductive core and said exterior casing; curing the curable sealant to provide a stable load supporting layer of sealant within the cable; and applying a mechanical retainer to the boot in the area of the load supporting layer to secure the boot to the cable.

2. The method of claim 1 wherein said curable sealant is an epoxy adhesive.

3. The method of claim 1 wherein said cable has a porous layer between said conductive core and said exterior casing and said step of forcing said sealant along the interior of said cable impregnates said porous layer.

4. The method of claim 3 wherein said porous layer is provided by a braided protective layer between a protective jacket of a conductive core and an exterior outer coating of the cable.

5. The method of claim 4 wherein said braided protective layer and said exterior outer coating are removed from an end of said cable and a protective cover applied to said protective jacket prior to insertion in to said boot.

6. The method of claim 1 wherein egress of sealant is inhibited by an interference fit between said cable and said boot and said step of inserting said cable includes expanding said boot about said cable.

7. The method of claim 6 wherein interference between said boot and said cable corresponds to the thickness of an exterior casing of said cable.

8. The method of claim 1 including the step of supporting said boot during insertion of said cable to inhibit radial expansion of said boot.

9. The method of claim 1 wherein said sealant does not fill said cavity prior to insertion of said cable.

10. The method of claim 1 wherein said sealant occupies between 50% and 70% of the volume of the cavity prior to insertion of said cable.

11. A cable having an elongate body including a conductive core, an exterior coating, and a porous layer between said conductive core and said exterior coating; a boot secured to one end of said body to seal said one end of said cable, said boot having a cavity to receive said cable, a cured sealant within said cavity and extending along said porous layer between said conductive core and said outer layer to provide a stable load supporting layer within said cable; and a mechanical fastener located over said cured sealant to secure said boot to said cable.

12. A cable according to claim 11 wherein said porous layer is a braided protective layer.

13. A cable according to claim 11 wherein said boot is an interference fit on said cable.

14. A cable according to claim 13 wherein said boot is pliable and stretches about said cable.

15. A cable according to claim 14 wherein the interference between said boot and said cable corresponds to the thickness of said exterior coating.

16. A cable according to claim 11 wherein said cavity is complimentary in shape to said cable.

17. A cable according to claim 11 wherein said exterior coating and said porous layer are removed from a portion of said one end of said cable and a hood extends over said portion of said cable to seal said conductor from said sealant.

18. A cable according to claim 11 wherein said boot and said sealant do not adhere to one another.

19. A cable according to claim 18 wherein said sealant is an epoxy and said boot is a thermoplastic vulcanizate.

20. An assembly jig having a pair of jaws to grip a cable and a moveable support for a boot, said support being moveable toward said jaws to force said boot on to said cable.

\* \* \* \* \*